United States Patent [19]

Tanaka et al.

[11] Patent Number: 4,802,029
[45] Date of Patent: Jan. 31, 1989

[54] AUTO-REVERSE TAPE RECORDER

[75] Inventors: Shinsaku Tanaka, Tokyo; Kunio Kido, Wako, both of Japan

[73] Assignee: Tanashin Denki Co., Ltd., Tokyo, Japan

[21] Appl. No.: 50,697

[22] Filed: May 18, 1987

[51] Int. Cl.$^4$ .................. G11B 15/48; G11B 15/00
[52] U.S. Cl. .................. 360/74.1; 360/96.3
[58] Field of Search .................. 360/74.1, 74.2, 69–70, 360/96.1, 96.3, 106, 137; 242/198, 199, 208

[56] References Cited

U.S. PATENT DOCUMENTS

| | | | |
|---|---|---|---|
| 4,326,225 | 4/1982 | Osanai | 360/78 X |
| 4,383,282 | 5/1983 | Osanai | 360/96.3 |
| 4,499,783 | 2/1985 | Takemasa | 360/74.1 X |
| 4,542,430 | 9/1985 | Tomita et al. | 360/74.1 X |
| 4,672,484 | 6/1987 | Teraguchi et al. | 360/96.3 |

Primary Examiner—John H. Wolff
Attorney, Agent, or Firm—Wegner & Bretschneider

[57] ABSTRACT

An auto-reverse tape recorder has an FF(fast forward) control, rewinding control and restraining members. The FF control member is movable forward so that when a magnetic head and a pinch roller are at operating positions, the head and roller are once caused to retreat toward their stop positions. The FF control member causes the head and roller to return to their operating positions when the FF control member returns to its non-operated position. The rewinding control member is movable forward so that when the head and roller are at the operating positions, the head and roller are once caused to retreat toward stop positions. The rewinding control member causes the head and roller to return to the operating positions when the rewinding control member returns to its non-operated position. The restraining member is operable in association with forward and return movements of the rewinding control member so that when the rewinding control member is in the course of movement, the restraining member restrains the movement of a rotation detecting member and the transmission of a biasing force from the detecting member to a tape running direction changeover mechanism is prevented to actuate the mechanism.

4 Claims, 10 Drawing Sheets

AUTO-REVERSE TAPE RECORDER

BACKGROUND OF THE INVENTION (1) Field of the Invention: tape running direction changeover operations with a simple structure.

(2) Description of the Prior Art:

When it is desired to give the high-speed feeding function to an auto-reverse tape recorder, a control member for feeding a tape at a high speed in the rightward direction and another control member for feeding the tape at a high speed in the leftward direction are usually provided. These two control members are selectively used to feed the tape at a high speed in either rightward or leftward direction.

Such a structure is however irksome in operation. When one wants to have a tape run at a high speed in the same direction as or in the opposite direction to the direction in which the tape is currently running in the course of a playback or recording operation, it must be necessary to ascertain the running direction of the tape at that time and then to judge, depending on the thus-ascertained running direction of the tape, which one of the control members should be operated. For this reason, the abovementioned structure is accompanied by a problem that it tends to induce erroneous operations.

If one wants to give a function by which the running direction of a tape can be changed over by a manual operation in the course of a playback or recording operation before the corresponding tape end is reached, other problems arise that more parts are required, the structure becomes complex and the manufacturing cost increases.

SUMMARY OF THE INVENTION

With the foregoing problems in view, the present invention has as its principal object the provision of an auto-reverse tape recorder which when one wants to fast-forward or rewind a tape in the course of a playback or recording operation, can easily and surely have the tape to run at a high speed in the desired direction without need for ascertainment of the running direction at that time and can also perform changeover of the running direction of the tape by a manual operation through a simple structure.

In one aspect of this invention, there is thus provided an auto-reverse tape recorder of such a type that a rotary force of a motor is transmitted selectively to either one of paired reel shafts by way of its corresponding friction mechanism for the transmission of the rotary force, a rotary force of the thus-selected reel shaft is applied to a rotation-detecting member via a rotation-detecting friction mechanism so as to bias the rotation-detecting member in a predetermined direction, the biasing force for the rotation-detecting member is applied to a tape running direction changeover mechanism, and the running direction of a tape is changed over upon elimination of the biasing force caused by a stop of the thus-selected reel shaft, comprising:

a fast forward control member movable forward from a non-operated position thereof by a tape fast forward operation so that when a magnetic head and a pinch roller associated with the thus-selected reel shaft are at their respective operating positions, the magnetic head and pinch roller are once caused to retreat toward their respective stop positions, said fast forward control member having the magnetic head and pinch roller return to their respective operating positions when the fast forward control member returns to the non-operated position thereof;

a rewinding control member movable forward from a non-operated position thereof by a tape rewinding operation so that when the magnetic head and the pinch roller associated with the thus-selected reel shaft are at their respective operating positions, the magnetic head and pinch roller are once caused to retreat toward their respective stop positions, said rewinding control member having the magnetic head and pinch roller return to their respective operating positions when the rewinding control member returns to the non-operated position thereof; and a restraining member operable in association with each of forward and return movements of the rewinding control member so that when the rewinding control member is in the course of movement, the restraining member restrains the movement of the rotation detecting member and the transmission of a biasing force from the rotation detecting member to the tape running direction changeover mechanism is prevented to actuate the tape running direction changeover mechanism.

In another aspect of this invention, there is also provided an auto-reverse tape recorder of such a type that a rotary force of a motor is transmitted selectively to either one of paired reel shafts by way of its corresponding friction mechanism for the transmission of the rotary force, a rotary force of the thus-selected reel shaft is applied to a rotation-detecting member via a rotation-detecting friction mechanism so as to bias the rotation-detecting member in a predetermined direction, the biasing force for the rotation-detecting member is applied to a tape running direction changeover mechanism, and the running direction of a tape is changed over upon elimination of the biasing force caused by a stop of the thus-selected reel shaft, comprising:

a tape running direction changeover member movable forward by a tape running direction changeover operation;

a restraining member operable in association with each forward movement of the tape running direction changeover member so as to restrain the movement of the rotation detecting member, whereby the transmission of a biasing force from the rotation detecting member to the tape running direction changeover member is prevented to actuate the tape running direction changeover member; and a temporary locking mechanism for holding the restraining member at a position moved forward, the holding of the restraining member being released by an operation of the tape running direction changeover mechanism.

When the fast forward control member is moved forward in the course of a playback or recording operation, the magnetic head and pinch roller are retreated to feed the tape at a high speed in the same direction. When the fast forward control member returns to its non-operated position, the magnetic head and pinch roller return to their respective operating positions to establish the previous playback or recording operation.

When the rewinding control member is moved forward in the course of a playback or recording operation, the magnetic head and pinch roller are retreated and in the course of movement of the rewinding control member, the restraining member restrains the movement of the rotation detecting member. The tape running direction changeover mechanism is hence actuated as if the tape has been fed to a tape end and the tape is then caused to run at a high speed in the opposite direction. In the course of the returning movement of the rewinding control member, the restraining member restrains again the movement of the rotation detecting member. As a result, the tape running direction changeover mechanism is actuated again to change the tape running direction to the previous direction and the magnetic head and pinch roller return to their respective operating positions to establish the previous playback or recording state.

When the rewinding control member is moved forward to a certain intermediate position in the course of a playback or recording operation, the restraining member restrains the movement of the rotation detecting member to actuate the tape running direction changeover mechanism. As a result, the playback or recording operation is resumed with the tape running direction changed.

The auto-reverse tape recorder of this invention simply requires an operation of the rewinding control member for performing a rewinding operation or an operation of the fast forward control member for performing a fast forward operation no matter in which direction the magnetic tape is driven to perform a playback or recording operation. The auto-reverse tape recorder of this invention is therefore free of the irksomeness of ascertaining the running direction of the tape. Its structure is also extremely simple, because the rewinding of the tape and the changeover of the running direction of the tape are achieved by using a tape running direction changeover mechanism for the auto-reverse function and actuating the mechanism through a manual operation.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
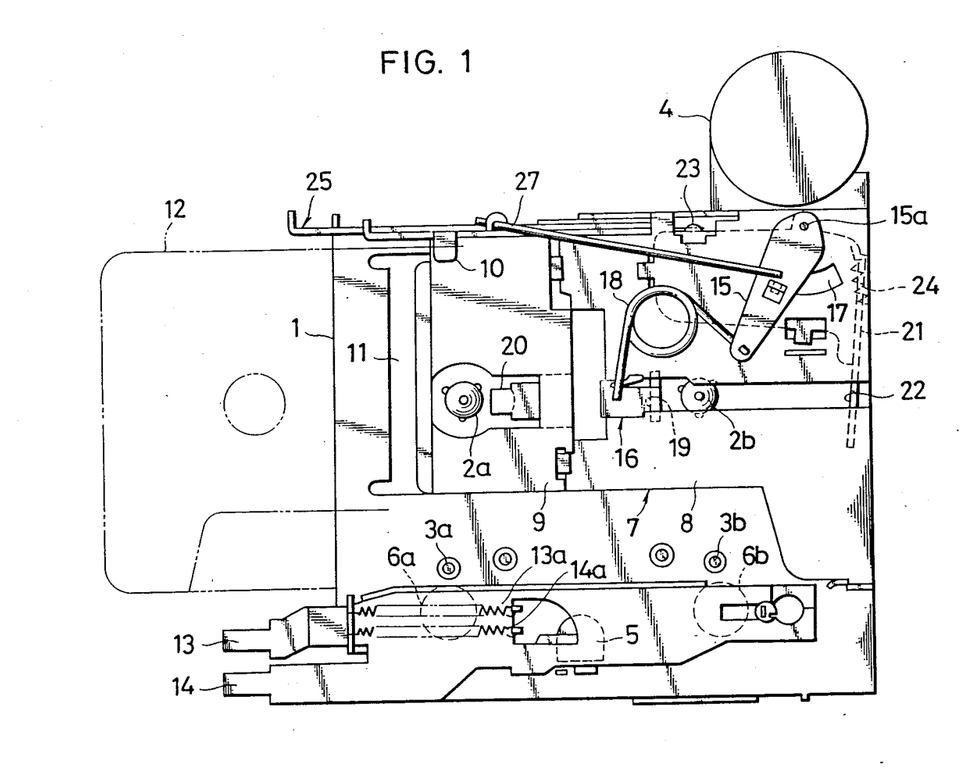
FIG. 1 is a top plan view of a cassette tape recorder according to one embodiment of this invention.

FIG. 1 is a plan view of a cassette tape recorder mechanism equipped with an auto-reverse function. In the drawing, numeral 1 indicates a main chassis. On the side of the upper surface of the main chassis 1, there are mounted a pair of reel shafts 2a,2b, capstans 3a,3b and a tape drive mechanism including a motor 4 for driving and rotating the reel shafts 2a,2b and capstans 3a,3b. The motor 4 can simultaneously rotate both capstans 3a,3b in their respective tape-feeding directions and can also rotate either one of the paired reel shafts 2a,2b selectively in its tape-winding direction.

Figure 6:
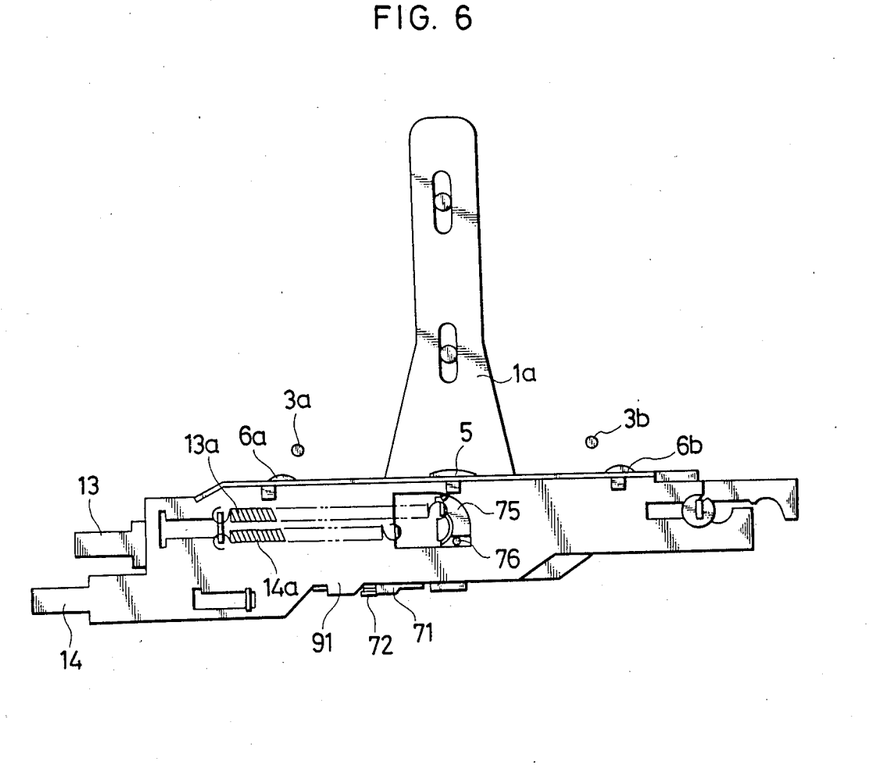

On the side of the upper surface of the main chassis 1, a head chassis 1a (see, FIG. 6) with a magnetic head mounted thereon for recording and playback is slidably mounted in the vertical direction as viewed on FIG. 1 (or FIG. 6). On both left-hand and right-hand sides of the magnetic head 5, pinch rollers 6a,6b are respectively provided corresponding to the respective capstans 3a,3b. A cassette holder 7 is also provided on the side of the upper surface of the main chassis 1. The cassette holder 7 is constructed of a turnable plate 8, which is turnable up and down (i.e., in a direction perpendicular to the plane of the drawing sheet) about an axis, i.e., the right edge thereof as viewed on FIG. 1, and a cassette loading member 9 which is turnable up and down (i.e., in a direction perpendicular to the plane of the drawing sheet) about the left edge of the turnable plate 8 as an axis. The degree of the upward turning movement of the cassette holder 7 is limited by bringing the upper surface of the cassette loading member 9 into contact with a stopper 10 formed on an upper side wall of the main chassis 1. Owing to the provision of this stopper 10, the turnable plate 8 and cassette loading member 9 are held in positions substantially parallel to the main chassis 1 when they have moved upwardly.

The cassette loading member 9 defines an opening 11, through which a tape cassette 12 can be loaded and unloaded, in the left side thereof as viewed on FIG. 1. When the turnable plate 8 turns downwardly with the tape cassette 12 inserted within the cassette loading member 9, the tape cassette 12 is loaded on the reel shafts 2a,2b and capstans 3a,3b. In this specification, the downwardly-turned position of the turnable plate 8 where the tape cassette 12 is loaded on the reel shafts 2a,2b and capstans 3a,3b will be called "operating position" of the cassette holder 7. On the other hand, the upwardly-turned position of the turnable plate 8 where the insertion or removal of the tape cassette 12 is permitted through the opening 11 will be called "stop position" of the cassette holder 7.

When the cassette holder 7 moves from the "stop position" to the "operating position", the head chassis 1a moves upwards as viewed on FIG. 1 in association with the movement of the cassette holder 7 so that the magnetic head 5 enters the tape cassette 12 and contacts a magnetic tape (not shown) enclosed within the tape cassette 12. When the magnetic head 5 enters the tape cassette 12 in the above-described manner, the pinch roller on the same side as the reel shaft driven by the motor in association with the movement of the head chassis 1a is brought into contact under pressure with the capstan on the same side. When the right-hand reel shaft 2a is driven for example, the right-hand pinch roller 6a is brought into contact with the right-hand capstan 3a. In this manner, the magnetic tape is driven in the rightward direction (or leftward direction) to perform a playback or rewinding operation.

In FIG. 1, numeral 13 indicates a rewinding control member while numeral 14 indicates a fast forward control member. Both control members 13,14 are superposed one over the other at a location above the magnetic head 5 and are arranged in such a way that they can freely advance and retreat respectively in the rightward and leftward directions as viewed on the drawing. They are normally biased in the leftward directions by their corresponding tension springs 13a,14a. When the rewinding control member 13 is pressed in the rightward direction as viewed on the drawing, the rotary force of the motor 4 is transmitted to the right-hand reel shaft 2b so that the reel shaft 2b is rotated at a high speed (see, FIGS. 4 and 6). When the rewinding control member 13 is pressed on the other hand, a projection 75a formed on the rewinding control member 13 is caused to push a turnable member 75. The turnable member 75 then pushes a pin 76. Since the pin 76 is secured on the head chassis 1a, the head chassis 1a is caused to retreat when the rewinding control member 13 is pushed. At the same time, the pinch roller 6a is separated from the capstan 3a so that the magnetic tape is fed at a high speed.

On the side of the upper surface of the turnable plate 8, a spring bearing member 15 is mounted turnably with one end thereof pivoted on a pin 15a. An eject member 16 is also provided in the turnable member 8 in such a way that the eject member 16 is slidable in the direction of insertion and removal of the tape cassette 12 namely, in the horizontal direction as viewed on the drawing.

The spring bearing member 15 is arranged with its free end directed substantially toward the eject member 16 and the degree of its turning movement is limited by an arcuate slot 17 formed in the turnable plate 8. An ejection spring 18 in the form of a torsion spring extends between the eject member 16 and the free end of the spring bearing member 15. The eject member 16 has at one end thereof (the left end as viewed on the drawing) an abutting portion 19 to which the tape cassette 12 is brought into contact upon its insertion into the cassette loading member 9. At the other end, the eject member 16 has an engaging claw portion which is brought into engagement with one of reel hub holes of the tape cassette 12 inserted within the cassette loading member 9. On the lower surface of the turnable plate 8, a plate-like lock lever 21 is provided turnably about the pin 15a of the spring bearing member 15. The lock lever 21 has a contact piece 22 located on the path of movements of the eject member 16 and a lock portion which engages the upper side edge of the main chassis 1 to hold the cassette holder 7 in the "operating position". The lock lever 21 is normally biased toward the upper side edge of the main chassis 1 by a tension spring 24.

In order to perform a playback or recording operation with the above-described structure, the tape cassette 12 is firstly inserted through the opening 11 into the cassette holder 7 in the lengthwise direction and in a state substantially parallel to the main chassis 1. The leading end of the tape cassette 12 hence pushes the abutting portion 19 of the eject member 16. As a result, the eject member 16 is pushed against the ejection spring 18. As the eject member 16 is pushed, namely, moves forward, the degree of elastic deformation of the ejection spring 18 increases little by little. As soon as the eject member 16 is pushed beyond a position where the degree of elastic deformation of the ejection spring 18 reaches the maximum, the elastic force of the ejection spring 18 acts in such a way that the eject member 16 is moved in the forward direction. No additional force is therefore required to push the tape cassette 12. By the elastic force of the ejection spring 18, the tape cassette 12 is pulled into the cassette holder 7 and the eject member 16 presses the contact piece 22 of the lock lever 21. As a consequence, the lock lever 21 turns against the tension spring 24, and the lock portion 23 is released from the upper side edge of the main chassis 1 so that the cassette holder 7 moves downward to the operating position, where the tape cassette 12 in the cassette loading member 9 is loaded on the reel shafts 2a,2b and capstans 3a,3b. In association with the downward movement of the cassette holder 7, the head chassis 1a moves forward, in other words, advances so that the magnetic head 5 is brought into contact with the magnetic tape and at the same time one of the pinch rollers (for example, the pinch roller 6a) is brought into contact under pressure with the corresponding capstan 3a to make the tape recorder ready for a recording or playback operation.

Figure 2:
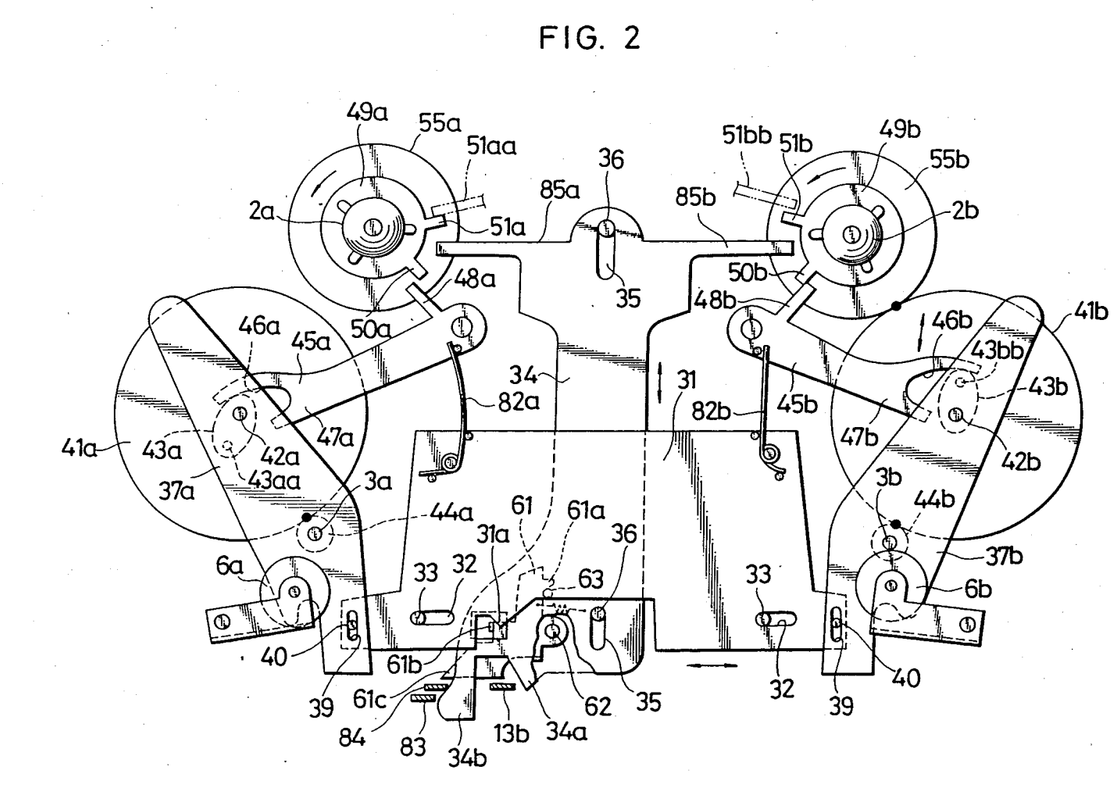
FIG. 2 and FIGS. 7–11 are plan views illustrating a changeover mechanism for the running direction of a tape and its associated parts.
Figure 7:
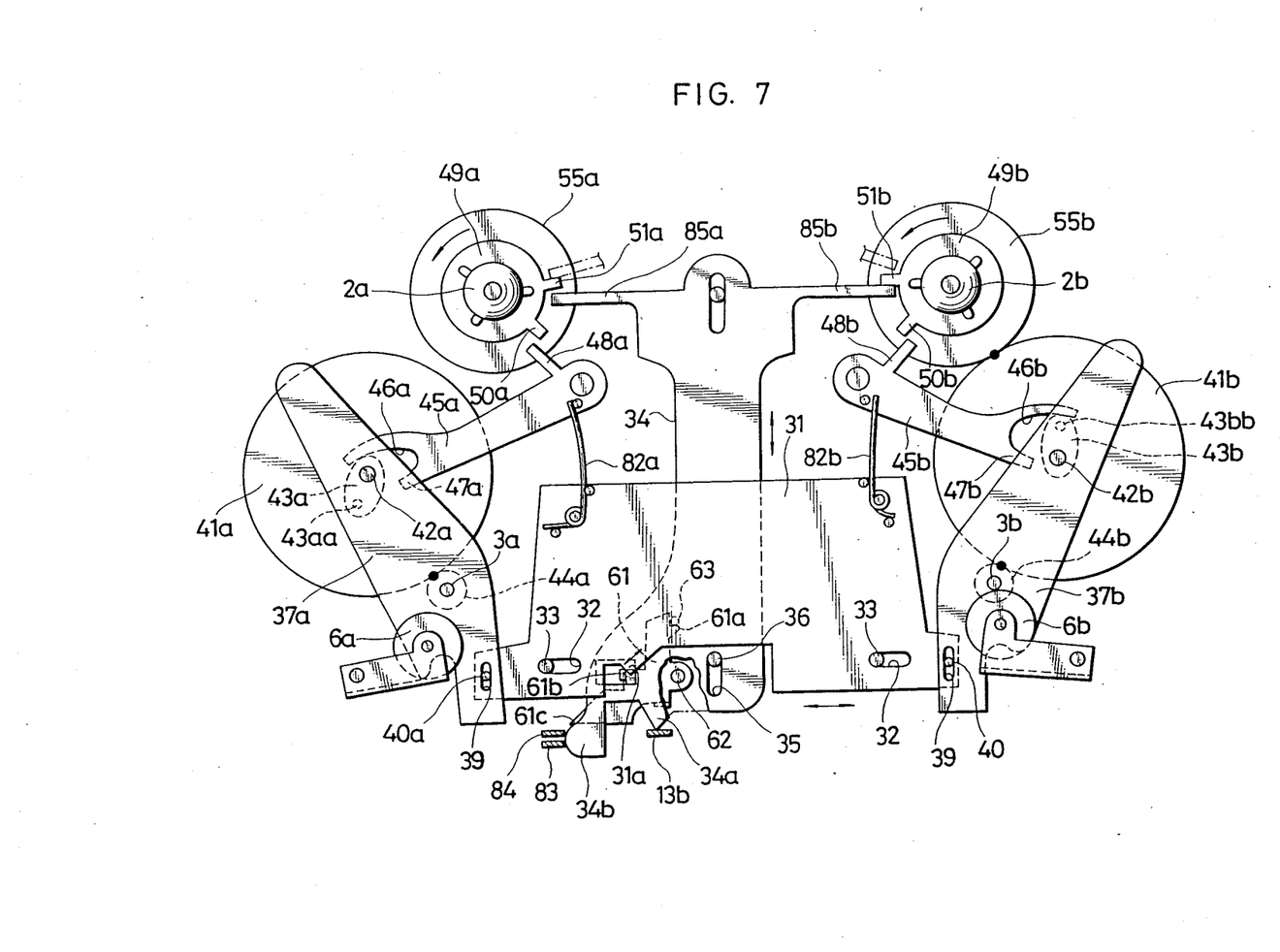

A description will next be made of a tape-rewinding operation. FIG. 2 and FIG. 7 and its subsequent drawings illustrate the construction of a changeover mechanism for the running direction of a tape and its associated parts. In the drawings, numeral 31 indicates a changeover plate. The changeover plate 31 is arranged on the side of the upper surface of the main chassis 1 and owing to the engagement between a guide slot 32 and a guide pin 33, is slidable in the horizontal direction as viewed on the drawings. Underneath the changeover plate 31, a restraining member 34 in the form of a plate is provided. Owing to the engagement between a guide slot 35 and a guide pin 36, this restraining member 34 is slidable vertically as viewed on the drawings. A triangular projection 34a is provided on the lower edge of the restraining member 34. When the rewinding control member 13 is pressed, a bent portion 13b (see, FIG. 5) formed at a part of the rewinding control member 13 is brought into sliding contact with an oblique edge of the projection 34a so that the restraining member 34 is caused to move in the upward direction as viewed on the drawings.

To both left and right ends of the changeover plate 31, turnable arms 37a,37b are respectively connected by the engagement between the slots 39,39 and their corresponding pins 40,40. The turnable arms 37a,37b are turnable about their corresponding capstans 3a,3b. Gears 41a,41b are rotatably mounted on the corresponding arms 37a,37b via gears 41a,41b. It should be noted that in FIG. 2 and FIG. 7 and its subsequent drawings, gears are indicated by mere circles corresponding to their respective pitch circles for the sake of simplification and the meshing locations of the gears themselves are indicated by solid dots (●).

The gears 41a,41b are provided as unitary members with eccentric circular cams 43a,43b and pressing pins 43aa,43bb respectively. The gears 41a,41b are maintained in meshing engagement with their corresponding gears 44a,44b, which rotate together with their associated capstans 3a,3b. The rotary force from the motor 4 is hence transmitted to the gears 41a,41b via the gears 44a,44b respectively.

Designated at numerals 45a,45b are left-hand and right-hand cam followers. The cam followers 45a,45b are mounted turnably on the main chassis 1 and extended arms 46a,46b provided at one ends of the cam followers 45a,45b are held in contact with the peripheral surfaces of the eccentric circular cams 43a,43b. In addition, contact arms 47a,47b are also provided at the same one ends of the cam followers 45a,45b and in adjacent to their corresponding extended arms 46a,46b. Pressure receiving arms 48a,48b extend out from the cam followers 45a,45b at locations near the centers of rotation of the cam followers 45a,45b.

On the other hand, rotation-detecting disks 49a,49b are provided concentrically with the reel shafts 2a,2b respectively. From the outer peripheries of the rotation-detecting disks 49a,49b, pressing fingers 50a,50b and finger-like stoppers 51a,51b extend out in adjacent relationship respectively. The pressing fingers 50a,50b are brought, in the directions of their rotation, into contact with their corresponding pressure receiving arms 48a,48b. The degree of counterclockwise rotation of the left-hand rotation detecting disk 49a is limited by the contact of the finger-like stopper 51a with a stopper 51aa. The degree of clockwise rotation of the right-hand rotation detecting disk 49b is limited by the contact of the finger-like stopper 51b with a stopper 51bb.

Figure 3:
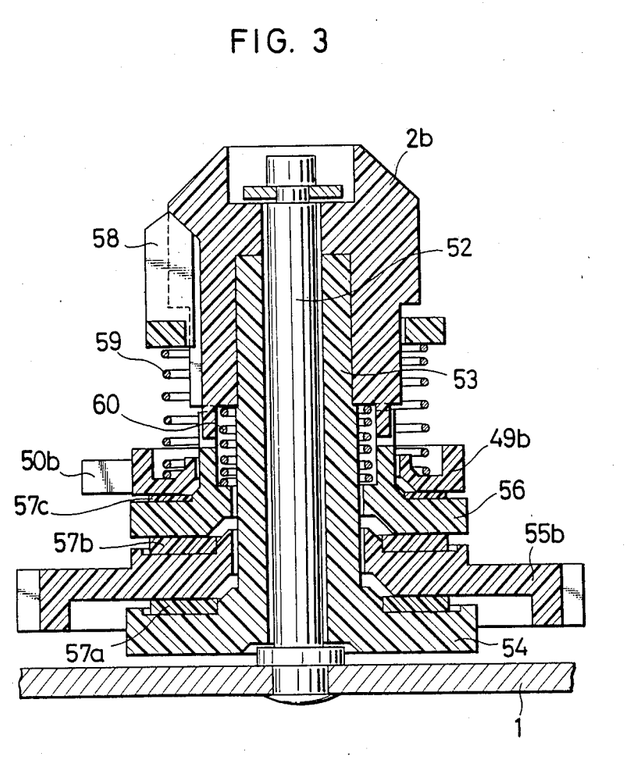
FIG. 3 is a vertical cross-section showing a reel shaft and its associated parts.

The reel shafts 2a,2b are mounted on the main chassis 1 as shown in FIG. 3. Since the mounting structures of the left-hand and right-hand reel shafts 2a,2b are the same, FIG. 3 shows the right-hand reel shaft 2b only.

As illustrated on FIG. 3, a fixed shaft 52 is provided upright on the main chassis 1. A cylinder 53 is rotatably loose-fit on the fixed shaft 52. A flange 54 is formed at the lower end of the cylinder 53. On the side of the upper surface of the flange 54, a reel gear 55b (note: a reel gear 55a is provided on the side of the left-hand reel shaft 2a although not shown in any drawings) and a pressure-receiving disk 56 are rotatably loose-fit on the outer side wall of the cylinder 53. Further, the above-described rotation detecting disk 49b is rotatably arranged on the side of the upper surface of the pressure-receiving disk 56. The reel shaft 2b has projections at lower end thereof. The pressure-receiving disk 56 defines recesses in which the projections of the reel shaft 2b are loosely received, whereby the pressure-receiving disk 56 and reel shaft 2b are allowed to rotate together. Disk-like friction pads 57a,57b,c, which are respectively made of felt or the like, are interposed respectively between the flange 54 and reel gear 55b, the reel gear 55b and pressure-receiving disk 56, and the pressure-receiving disk 56 and rotation detection disk 49. Further, coil springs 59,60 are interposed between a reel-engaging member 58, which is mounted movably up and down on the outer side wall of the reel shaft 2b, and the rotation detecting disk 49b and between the pressure-receiving disk 56 and reel shaft 2b respectively. A friction mechanism is constructed by these springs 59,60 and the above-mentioned friction pads 57a,57b,57c.

When the rotary force of the motor 4 is transmitted to the reel gear 55b, the rotary force is hence transmitted to the reel shaft 2b by way of the friction mechanism. While the reel shaft 2b is rotating, the pressing finger 50b provided on the rotation detecting disk 49b continues to press the pressure receiving arm 48b of the cam follower 45b. When an excessive load is applied to the reel shaft 2b during the rotation of the motor 4, for example, one of the tape ends is reached, slipping takes place at the upper and lower surfaces of the friction disks 57a,57b so that the reel shaft 2b is forced to stop. As a result, the pressing force of the pressing finger 50b against the pressure receiving arm 48b is eliminated.

On the side of the lower surface of the restraining member 34, a temporary lock plate 61 is provided turnably about a pivot 62 on the main chassis 1 as illustrated on FIG. 2. This temporary lock member 61 is provided with an engagement portion 61a. When the restraining member 34 is caused to slide in the upward direction as viewed on the drawing, a projection 63 provided on the lower surface of the restraining member 34 is brought into engagement with the engagement portion 61a so as to prevent the restraining member 34 from moving in the downward direction. A bent portion 61b is also provided with the temporary locking plate 61, which a triangular projection 31a is formed on the changeover plate 31. When the changeover plate 31 is caused to slide in the horizontal direction as viewed on the drawing, an oblique edge of the triangular projection 31a is caused to slide against the bent portion 61b so that the temporary lock plate 61 is turned counterclockwise as viewed on the drawing.

The relationship among the heat chassis 1a with the magnetic head 5 mounted thereon, the rewinding control member 13 and the fast forward control member 14 will next be described on the basis of FIG. 4 through FIG. 6.

Figure 4:
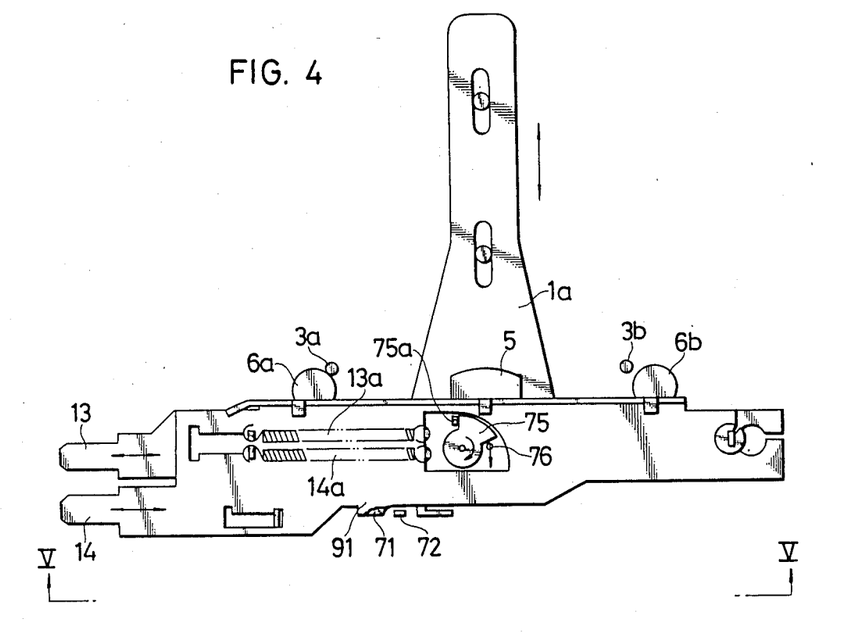
FIGS. 4 and 6 are plan views depicting the relationship between rewinding and fast forward control members and a head chassis.

When the tape cassette has been loaded, the head chassis 1a assumes the upwardly-advanced position as shown in FIG. 4, namely, in the playback or recording position.

Projections 71,91 of the same shape are provided on the side edges of the rewinding control member 13 and fast forward control member 14 at locations overlapped with each other.

A part of the lock member 72 (see, FIG. 5) is located in the path of movements of the projections 71,91. When the rewinding control member 14 or fast forward control member 14 are pressed in a playback or recording operation, the lock member 72 engages the projection 71 or 91 to prevent the control member 13 or 14 from returning to their original positions.

When the rewinding control member 13 or fast forward control member 14 is pressed, a part of the control member is brought into contact with a turnable member 75 (see, FIG. 4) supported pivotally on the main chassis 1 so that the turnable member 75 is caused to turn in the clockwise direction as viewed on the drawing. As a consequence, the turnable member 75 pushes a pin 76, which is provided upright on the head chassis 1a, in the downward direction as viewed on the drawing, whereby the head chassis 1a is caused to move downward as viewed on the same drawing.

Figure 5:
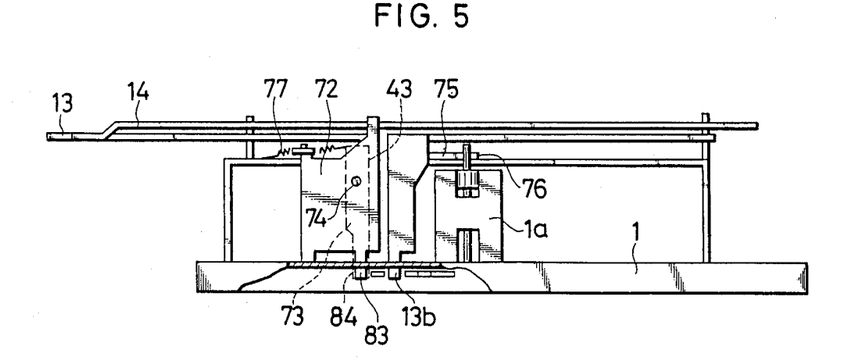
FIG. 5 is a side view as viewed in a direction indicated by arrows V,V on FIG. 4.

An auxiliary member 73 is pivotally provided on the lock member 72 via a pin 74 as depicted on FIG. 5. This auxiliary member 73 is biased by a spring 77 in a direction that the lock member 72 is pulled backwards.

When the above-described rewinding control member 13 is pressed, the bent portion 13b of the rewinding control member 13 (see, FIGS. 5 and 2) undergoes sliding movement along the associated oblique edge of the triangular projection 34a so as to have the restraining member 34 advance. The rotary force transmission mechanism which serves to transmit the rotary force selectively to the reel shaft 2a or 2b from the motor 4 is actuated to change the operation mode from the playback operation to a rewinding operation. Designated at numerals 82b,82a in FIG. 2 are wire springs attached to the changeover plate 31. Numerals 83,84 indicate pressing pieces formed at the lower ends of the lock member 72 and auxiliary member 73 respectively.

In the state shown in FIG. 2, the magnetic tape is caused to run in the rightward direction to perform a playback operation. At this time, the changeover plate 31 has already moved in the rightward direction as viewed on the drawing, the right-hand gears 44b, 41b and reel gear 55b mesh successively so as to transmit the rotary force of the motor 4 to the reel gear 55b, and the right-hand pinch roller 6b is maintained in contact under pressure with the capstan 3b. Since the changeover plate 31 has moved in the rightward direction, the left-hand turnable arm 37a is at a position turned counterclockwise about the capstan 3a as viewed on the drawing. As a result, the gear 41a is separated from the reel gear 55a and the pinch roller 6a is pushed back by the turnable arm 37a and assumes a position apart from the capstan 3a.

Since the right-hand cam follower 45b receives at the pressure receiving arm 48b the pressing force of the pressing finger 50b of the rotation detecting disk 49b to press the extended arm 46b against the outer side wall of the eccentric circular cam 43b. Whenever the gear 41b undergoes a single full rotation, the cam follower 45b repeats reciprocation. When the longest radius part of the eccentric circular cam 43b contacts the extended arm 46b, the contact arm 47b begins to assume a position on the orbit of rotation of a pressing pin 43bb. Since the cam follower 45b turns clockwise as viewed on the drawing by the rotation of the eccentric circular cam 43b before the pressing pin 43bb is brought into contact with the contact arm 47b, the pressing pin 43bb will not contact the contact arm 47b as long as the cam follower 45b receives a pressing force from the rotation detecting disk 49b.

On the other hand, the left-hand cam follower 45a is normally biased counterclockwise by the wire spring 82a provided on the changeover plate 31 instead of receiving any pressing force from the pressing finger 50a of the rotation detecting disk 49a. Whenever the gear 41a undergoes a full rotation, the cam follower 45a thus repeats reciprocation with the extended arm 46a pressed against the outer side wall of the eccentric circular cam 43a.

Figure 8:
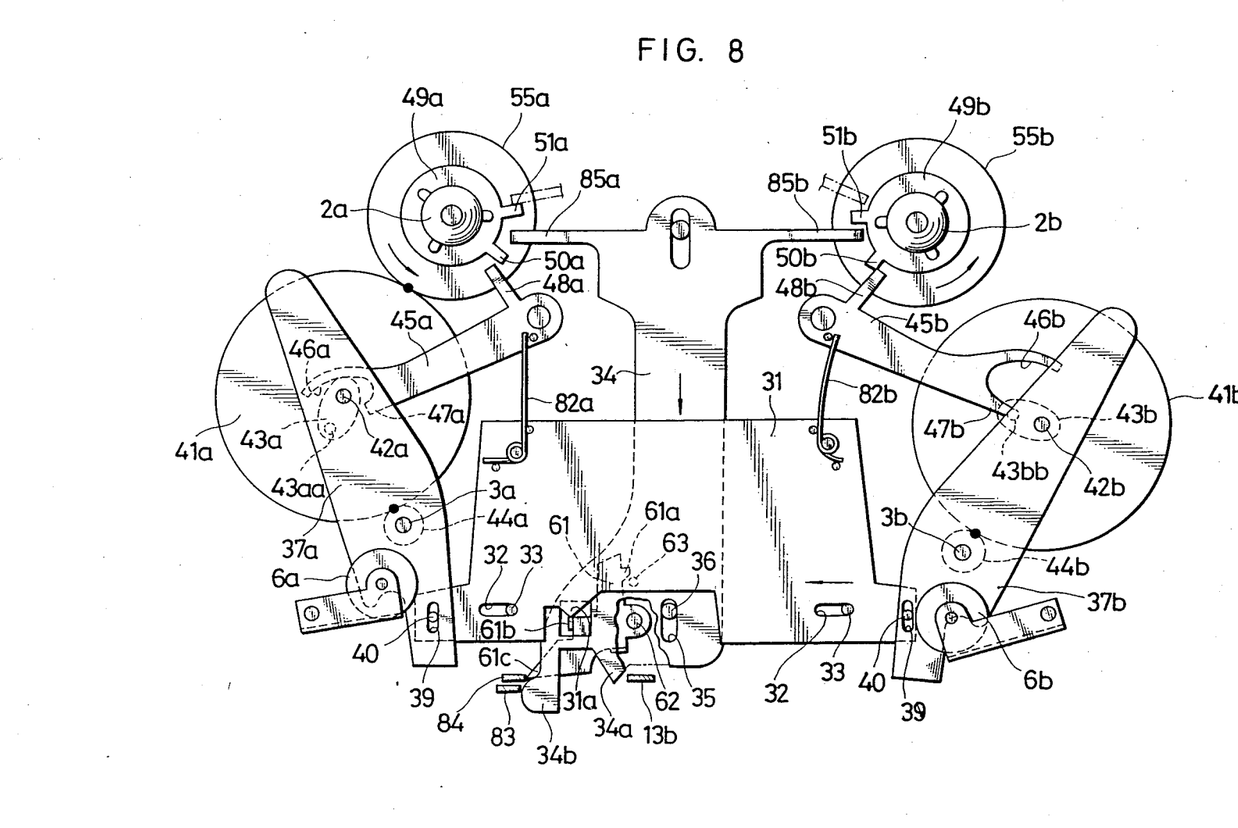
Figure 10:
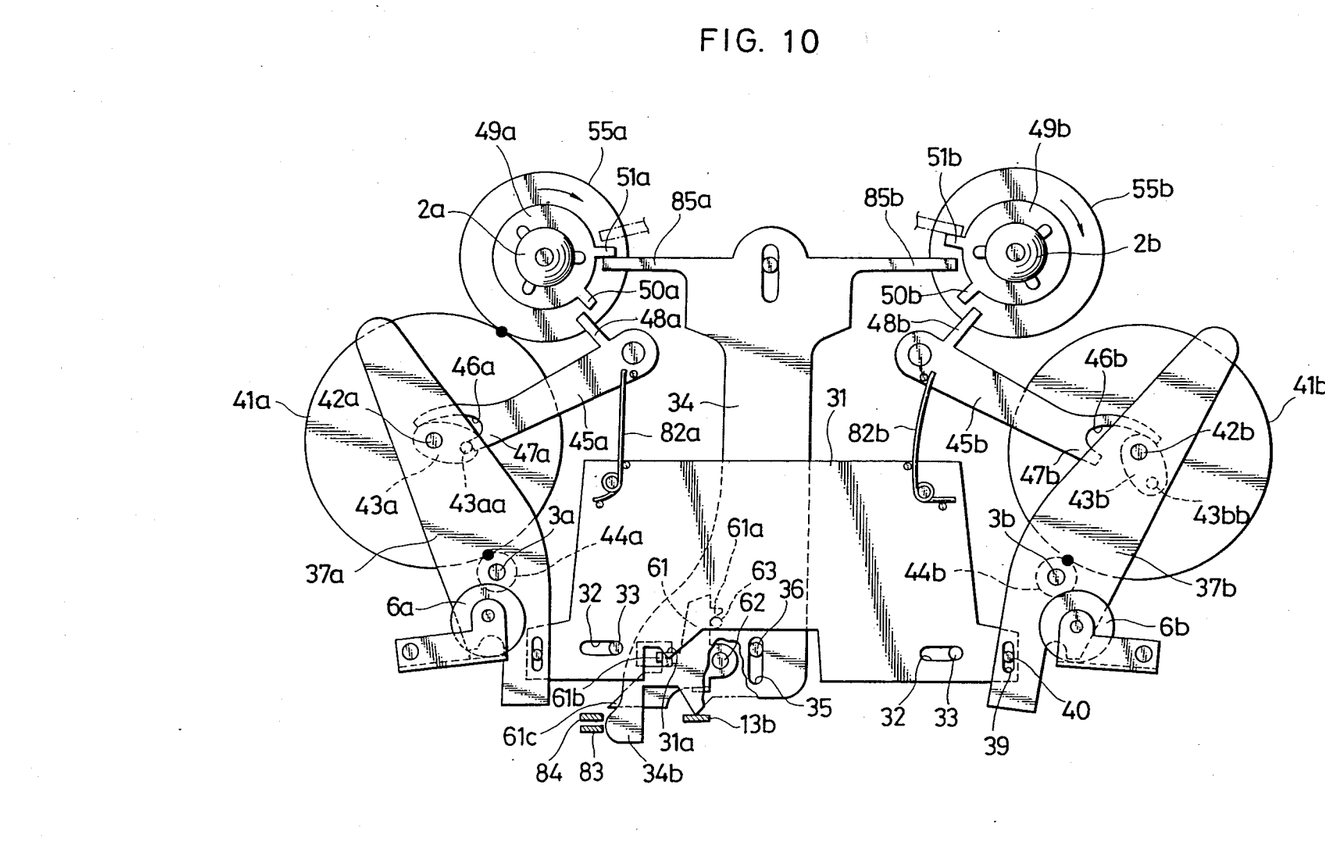

When the rewinding control member 13 is pressed in the state shown on FIG. 2, the bent portion 13b of the control member 13 pushes the triangular projection 34a of the restraining member 34 as shown in FIG. 7 so that the restraining member 34 is caused to move in the upward direction as viewed on the drawing. Of engagement arms 85a,85b extending out from both upper side edges of the restraining member 34, the right-hand engagement arm 85b hence pushes back the finger-like stopper 51b of the detecting disk 49b so that the pressing finger 50b is moved away from the pressure-receiving arm 48b to prevent counterclockwise rotation of the detecting disk 49b. When the cm follower 45b is pushed at the extended arm 46b by the longest radius part of the eccentric circular cam 43b and turns in the counterclockwise direction, the cam follower 45b stops at the thus-turned position. When the gear 41b turns further in the same state, the pressing pin 43bb is brought into contact with the free end of the contact arm 47b and the turnable arm 37b therefore turns clockwise as shown in FIG. 8. On the other hand, the restraining member 34 does not immediately return to its original position even after the projection 63 has engaged the engagement portion 61a of the temporary lock plate 61 subsequent to the upward movement of the restraining member 34, in other words, the bent portion 13b of the rewinding control member 13 has passed beyond the triangular projection 34a of the restraining member 34. When the changeover plate 31 is caused to slide in the leftward direction as viewed on the drawing by a turning movement of the turnable arm 37b, the triangular projection 31a of the changeover plate 31 is brought into engagement with the bent portion 61b of the temporary lock plate 61 so that the temporary lock plate 61 is caused to turn counterclockwise. Accordingly, the restraining member 34 is released from its locking by the temporary lock plate 61 and is allowed to return to its original position as shown on FIG. 8. When the restraining member 34 moves upwards, an extension 34b provided at a rear end portion of the restraining member 34 pushes back the pressing piece 84 of the auxiliary member 43 (see, FIG. 4) in the leftward direction as shown in FIG. 7. Even when the temporary lock plate 61 turns counterclockwise as shown in FIG. 8, the bent portion 61b of the temporary lock member 61 does not therefore contact the pressing piece 84 and needless to say, the turning force of the temporary lock plate 61 is not transmitted via the pressing piece 84 to the pressing piece 83 of the lock member 72. It is therefore possible to avoid such a false operation that the holding of the rewinding control member 13 could be released by a turning motion of the temporary lock plate 61 caused by a movement of the changeover plate 31. By the turning motion of the turnable arm 37b in the clockwise direction, the gear 41b moves away from the reel gear 55b and the resulting leftward movement of the changeover plate 31 causes the left-hand turnable arm 37a to move in the clockwise direction as viewed on the drawing, whereby the gear 41a is brought into meshing engagement with the reel gear 81a as shown in FIG. 10. As a result, the rotary force of the motor 4 is transmitted to the reel gear 55a via the gears 44a,41a. At this time, the pinch roller 6a is apart from its associated capstan because the head chassis 1a has retreated as a result of the movement of the rewinding control member 13. The rewinding of the tape in the leftward direction is performed accordingly. In addition, the temporary lock plate 61 has returned to its original position at this time.

Figure 11:
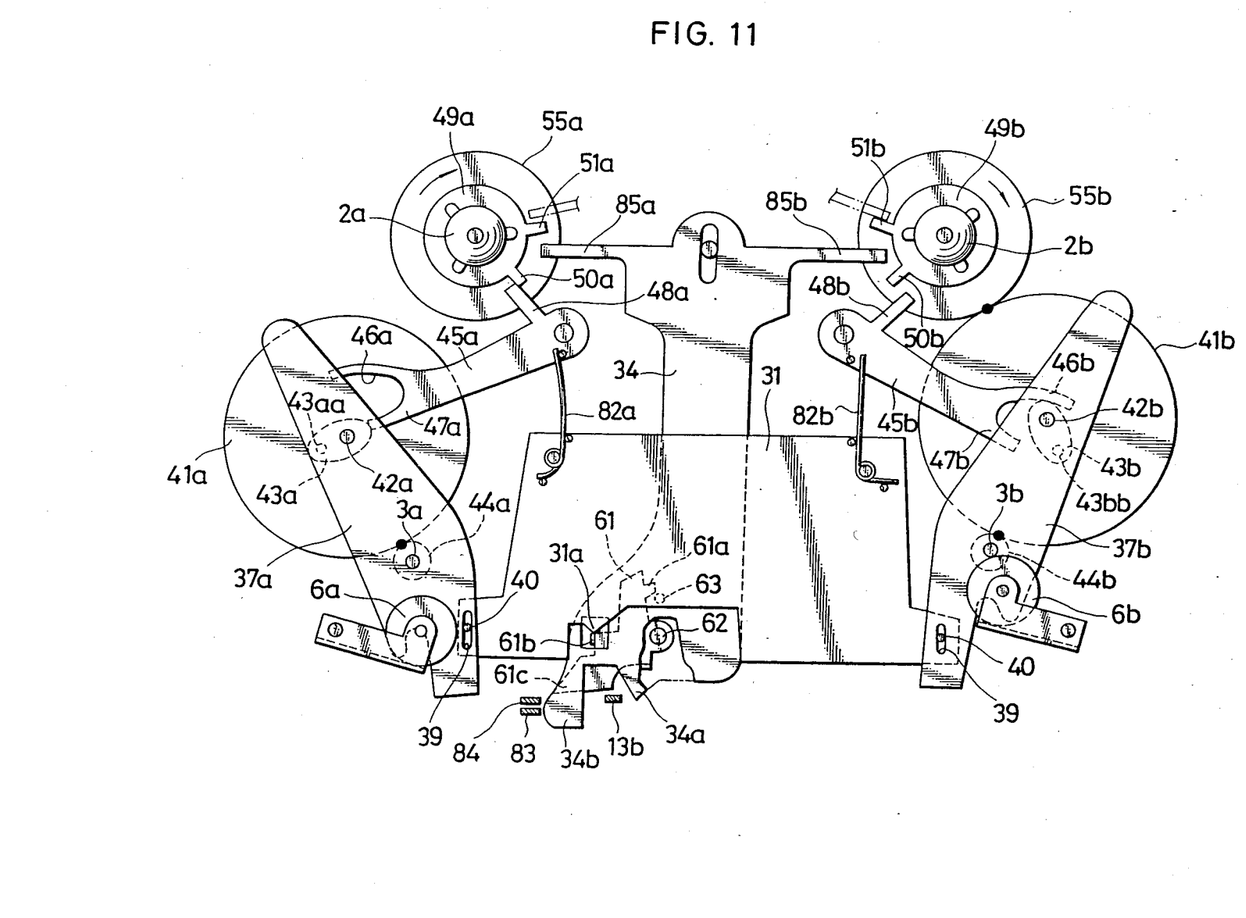

When it is desired to return to the previous playback operation after the tape has been rewound to a desired position, it is only necessary to press the fast forward control member 14. Namely, the rewinding control member 13 is held at the pressed position by the lock member 72 during the rewinding operation as illustrated in FIG. 6. When the fast forward control member 14 is pressed in this state, the fast forward control member 14 pushes at a tilted end portion of the projection 91 thereof the lock member 72 in the downward direction as viewed on FIG. 6 so that the holding of the rewinding control member 13 by the lock member 72 is released. The rewinding control member 13 is then allowed to return to its original position by the spring 13a. In the course of its return, the bend portion 13b is brought into contact with the triangular projection 34a of the restraining member 34 so that the restraining member 34 is once moved upwardly as shown in FIG. 10. As a result, the left-hand engagement arm 85a of the restraining member 34 pushes back the finger-like stopper 51a of the left-hand detecting disk 49a in the counterclockwise direction. Accordingly, the cam follower 45a is pushed by the longest radius part of the eccentric circular cam 43a and then remains at the position turned clockwise. The pressing pin 43aa is therefore brought into contact with the free end of the contact arm 47a and the turnable arm 37a is then turned counterclockwise by the rotary force of the gear 41a. As a consequence, the gear 41a is separated from the reel gear 55a and the changeover plate 31 moves rightwards. The right-hand turnable arm 37b then turns counterclockwise and as illustrated in FIG. 11, the right-hand gear 41b is brought into meshing engagement with the reel gear 55b. Upon return of the rewinding control member 13 to its original inoperative position, the head chassis 1a advances and the magnetic head 5 and pinch roller 6b return to their respective operating positions, thereby established the previous operating state of playback.

Figure 9:
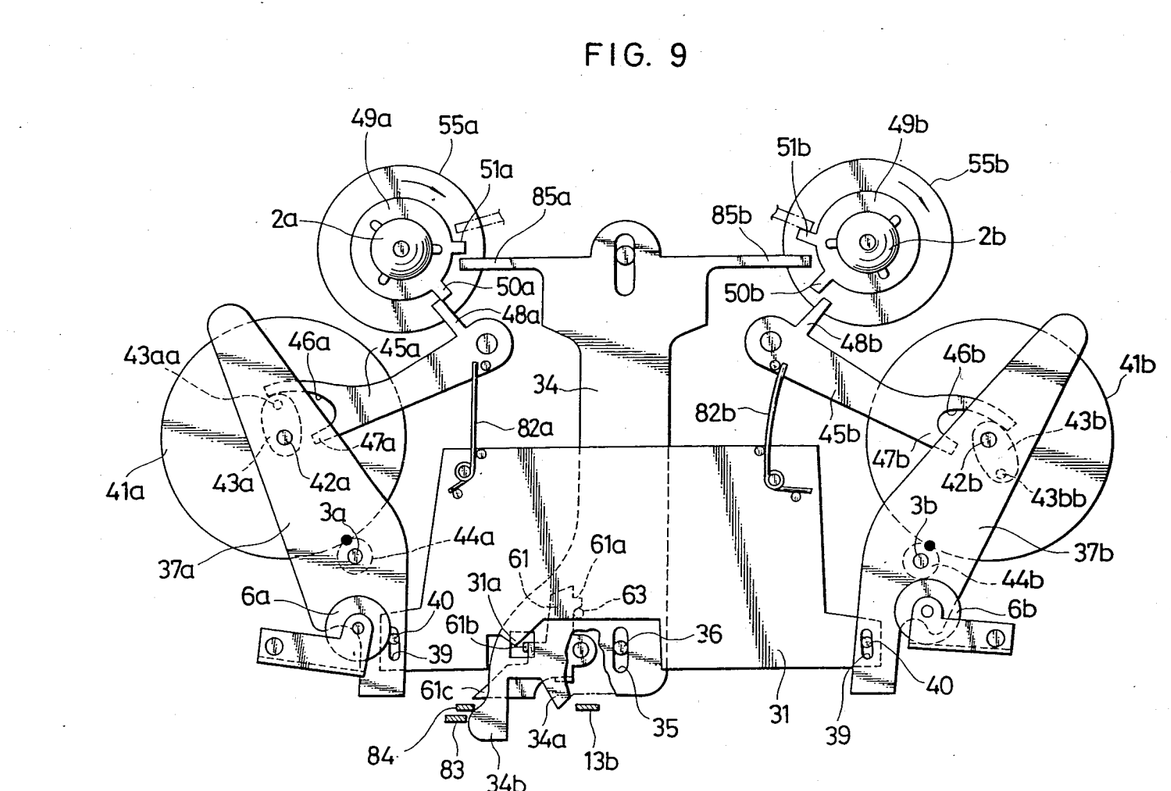

When the tape has been rewound to its end in the operating state of rewinding depicted in FIG. 9, both reel shaft 2a and detecting disk 49a are stopped. Accordingly, the biasing force for the cam follower 45a is eliminated. After the longest radius part of the eccentric circular cam 43a is brought into contact with the extended arm 46a of the cam follower 45a, the pressing pin 43aa is brought into contact with the free end of the contact arm 47a and the turnable arm 37a is hence caused to turn counterclockwise. As a result, the changeover plate 31 moves rightwards as viewed on the drawing so that the right-hand turnable arm 37b is caused to turn counterclockwise to bring the gear 41b into meshing engagement with the reel gear 55b. Accompanying the above movement of the changeover plate 31, the temporary lock plate 61 is turned counterclockwise to push the pressing piece 84 of the auxiliary member 73 and then the pressing piece 83 of the lock member 72 by way of the pressing piece 84. Since the lock member 72 is hence turned to release the holding of the rewinding control member 13, the head chassis 1a is caused to advance and return by the return of the rewinding control member 13, thereby returning to the previous operating state of playback. When it is desired to return to the previous operating state of playback after fast-forwarding the tape to a desired position in the course of a playback operation, the fast forward control member 14 is pressed first of all to have the turnable member 75 turn clockwise so that the head chassis 1a is retreated to have the magnetic head 5 and pinch roller 6a retreat. By this operation, the operating state of fast forwarding is established. When the tape has been taken up to a desired position, the rewinding control member 13 is pressed to release the locking of the fast forward control member 14 by the lock member 72.

It has been described by way of example the manner of performing a fast forward operation while the tape is driven rightwards to perform a playback operation. If one wants to perform rewinding in the course of a leftward playback operation, it is only necessary to press the rewinding control member 13. In order to perform a fast forwarding operation in the course of the above operation, it is only required to press the fast forward control member 14. Furthermore, the rewinding and fast forwarding operations in the course of a recording operation can also be performed in the same manner as in the playback operation.

Having now fully described the invention, it will be apparent to one of ordinary skill in the art that many changed and modifications can be made thereto without departing from the spirit or scope of the invention as set forth herein.

We claim:

1. An auto-reverse tape recorder of such a type that a rotary force of a motor is transmitted selectively to either one of paired reel shafts by way of its corresponding friction mechanism for the transmission of the rotary force, a rotary force of the thus-selected reel shaft is applied to a rotation-detecting member via a rotation-detecting friction mechanism so as to bias the rotation-detecting member in a predetermined direction, the biasing force for the rotation-detecting member is applied to a tape running direction changeover mechanism, and the running direction of a tape is changed over upon elimination of the biasing force caused by a stop of the thus-selected reel shaft, comprising:

a fast forward control member movable forward from a non-operated position thereof by a tape fast forward operation so that when a magnetic head and a pinch roller associated with the thus-selected reel shaft are at their respective operating positions, the magnetic head and pinch roller are once caused to retreat toward their respective stop positions, said fast forward control member having the magnetic head and pinch roller return to their respective operating positions when the fast forward control member returns to the non-operated position thereof;

a rewinding control member movable forward from a non-operated position thereof by a tape rewinding operation so that when the magnetic head and the pinch roller associated with the thus-selected reel shaft are at their respective operating positions, the magnetic head and pinch roller are once caused to retreat toward their respective stop positions, said rewinding control member having the magnetic head and pinch roller return to their respective operating positions when the rewinding control member returns to the non-operated position thereof; and a restraining member operable in association with each of forward and return movements of the rewinding control member so that when the rewinding control member is in the course of movement, the restraining member restrains the movement of the rotation detecting member and the transmission of a biasing force from the rotation detecting member to the tape running direction changeover mechanism is prevented to actuate the tape running direction changeover mechanism.

2. The auto-reverse tape recorder as claimed in claim 1, wherein the restraining member causes the magnetic head and pinch roller to retreat toward their respective stop positions when the rewinding control member has moved forward beyond a predetermined degree, the restraining member restrains the movement of the rotation detecting member when the restraining member assumes a position closer to a non-operated position thereof than the position corresponding to the predetermined degree, and the restraint of the movement of the rotation detecting member is released when the rewinding control member returns from the position closer to the non-operated position or moves further forward beyond the predetermined degree.

3. An auto-reverse tape recorder of such a type that a rotary force of a motor is transmitted selectively to either one of paired reel shafts by way of its corresponding friction mechanism for the transmission of the rotary force, a rotary force of the thus-selected reel shaft is applied to a rotation-detecting member via a rotation-detecting friction mechanism so as to bias the rotation-detecting member in a predetermined direction, the biasing force for the rotation-detecting member is applied to a tape running direction changeover mechanism, and the running direction of a tape is changed over upon elimination of the biasing force caused by a stop of the thus-selected reel shaft, comprising:

a tape running direction changeover member movable forward by a tape running direction changeover operation;

a restraining member operable in association with each forward movement of the tape running direction changeover member so as to restrain the movement of the rotation detecting member, whereby the transmission of a biasing force from the rotation detecting member to the tape running direction changeover member is prevented to actuate the tape running direction changeover member; and a temporary locking mechanism for holding the restraining member at a position moved forward, the holding of the restraining member being released by an operation of the tape running direction changeover mechanism.

4. The auto-reverse tape recorder as claimed in claim 3, wherein the tape running direction changeover mechanism has a changeover plate movable in association with contacting or separating movements of the paired pinch rollers relative to the corresponding capstans, and the holding of the restraining member by the temporary lock mechanism is released by the engagement between an engaging portion formed on the changeover plate and an engaged portion provided on the restraining member.

* * * * *